Sept. 18, 1934.  A. B. WELTY  1,973,969
COMBINATION WHEEL FOR HARVESTER THRESHERS
Filed July 13, 1933
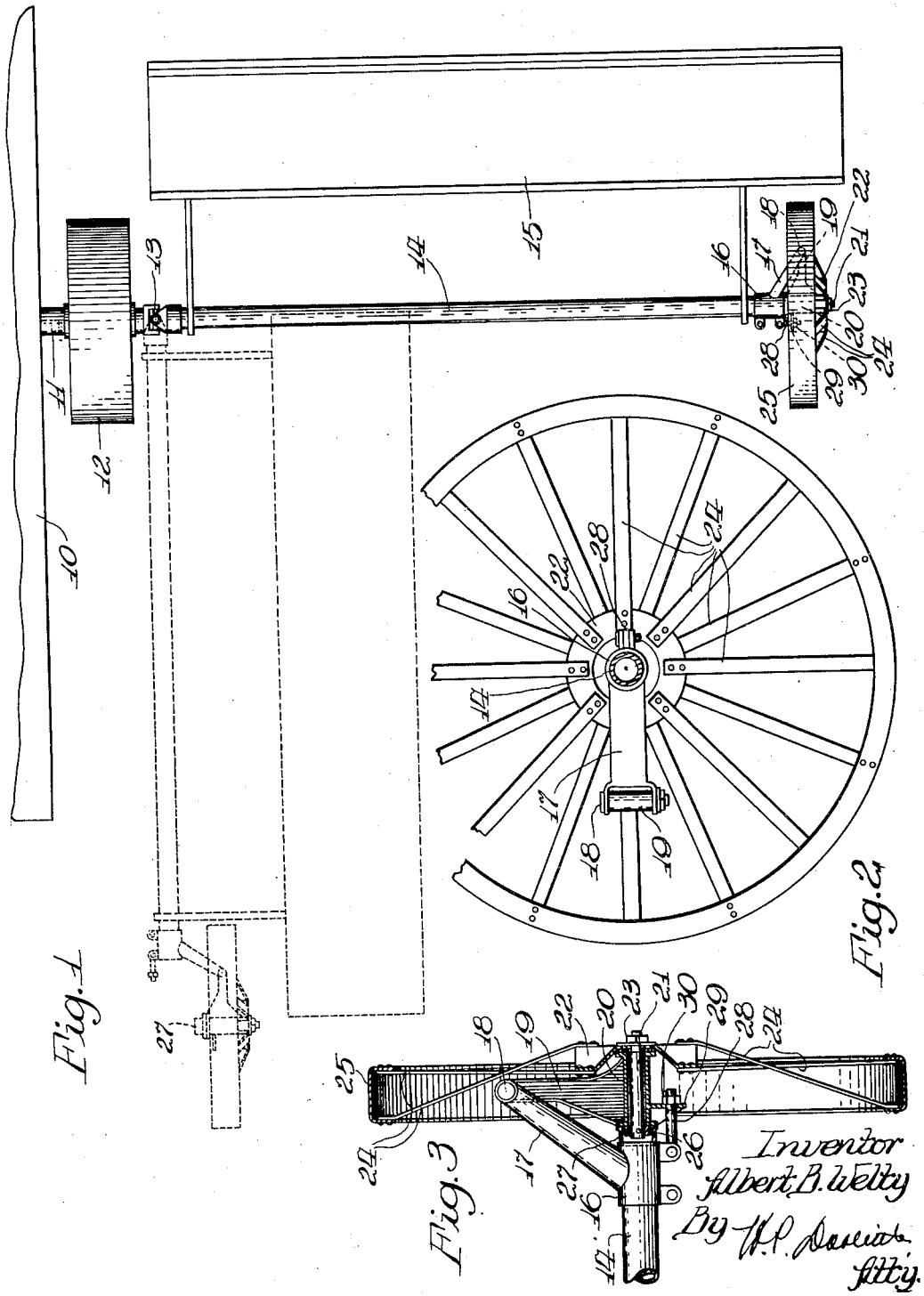

UNITED STATES PATENT OFFICE 1,973,969

COMBINATION WHEEL FOR HARVESTER THRESHERS

Albert B. Welty, Kenilworth, Ill., assignor to International Harvester Company, a corporation of New Jersey Application July 13, 1933, Serial No. 680,184

10 Claims. (Cl. 56—322)

The invention relates generally to harvester threshers of the folding type and particularly to an improved combination grain and caster wheel assembly for supporting the grainward end of the harvester part in the cutting and folded transport positions thereof.

The object of the invention is to provide an improved, simplified wheel assembly of the type mentioned which is fixed against castering in the grain cutting position of the harvester, and which wheel can be released for free castering movement when the harvester is in its folded, trailing, transport position, said wheel always being in supporting relation to the free end of the harvester part.

This object is briefly achieved by locating an arm on the free end of the harvester axle, the end of said arm providing a pivot point for a yoke member which carries a pin in turn carrying the wheel. Said wheel has an offset hub and bowed out spokes to permit locating the pivot point end of the arm inside the periphery of the wheel tire and on a central vertical plane passed through the wheel. Such location of this pivot point permits the wheel in its released position to caster freely.

In the drawing showing a practicable form of the invention:

Figure 1 is a plan view of so much of a harvester thresher as is necessary to show the wheel assembly, said wheel shown in grain cutting position of the harvester in full lines; and, in the dotted lines, showing the harvester and wheel in the folded transport position;

Figure 2 is a side elevational view of the wheel assembly, looking from its stubbleward side; and, Figure 3 is a plan view showing a horizontal, central sectional view through the wheel.

These combination wheels are used with harvester threshers having a thresher part 10 carried on an axle 11 and a pair of wheels, only one of which is shown at 12. The grainward end of the axle 11, grainwardly of the wheel 12, has connected to it by a two-way hinge 13, a normally transverse harvester support or axle 14, said hinge permitting floating or oscillatory movement of the axle 14 to conform to ground contour, and folding movement rearwardly and horizontally to narrow the overall width of the machine for transport through narrow places, in a manner well understood in this art. A harvester header platform part is shown at 15 supported in the usual way by the support 14. The grainward end of the support 14 is carried by the improved wheel assembly of this invention now to be described.

The grainward end of the support 14 has fixed to it a sleeve or bracket 16 including a forwardly and outwardly extending arm 17 carrying at its free, bifurcated end, a vertically disposed pin 18, to which pin the front end of a longitudinally and rearwardly extending yoke member 19 is pivotally connected. The rear end of the yoke terminates in a cross-sleeve portion 20 in which is turnably carried a short wheel axle or pin 21 including a hub 22 clamped to its outer end by a nut 23. The hub carries spokes 24 in turn carrying the wheel tire 25. A sleeve 26 is pinned to the opposite end of the axle 21 to hold the axle properly in the sleeve 20, and a dust proof cap 27 closes the axle end assembly, as shown. The wheel is of the dished type having an offset hub, the load, however, being properly distributed on the bearing or axle 21.

The sleeve 16 hingedly carries at its rear side a latch pin 28 cooperating with a slotted bracket 29 formed on the rear of the sleeve 20, so that, by means of a nut 30, the wheel 25 can be secured or latched to the sleeve 16, to make the pivot 18 inactive and thereby lock said wheel against castering, but permitting it to turn or roll.

In use, in cutting grain, the platform 15 and support 14 are in the transverse cutting position shown in the full lines in Figure 1. The wheel 25 is latched by pin 28 against castering in the manner described, because in the grain cutting position it is preferable that the wheel does not caster. When it is desired to transport the machine over a road from one field to another, then the harvester part is folded alongside the thresher part by swinging the support 14 about its hinge 13 to the dotted line position of the parts shown in Figure 1. First, however, before so folding the parts, the latch 28 is released to free the wheel, so that, as the support 14 is folded, the wheel 25 casters to form a rolling support for carrying the harvester part to its folded position. As the machine thereafter is drawn forwardly, the wheel 25 assumes a trailing, castering position, as shown in dotted lines in Figure 1, with the pivot point 18 located within the periphery of the wheel, thus permitting the greatest possible freedom of castering for such a compact wheel assembly. Further, in the cutting position of the wheel, its axis is in line with the axis of the support 14.

This pivot point location has the advantage of permitting the wheel to caster without tilting the wheel as is necessary when the pivot point is outside and laterally of the wheel.

From this disclosure it will now be seen that an improved, compact combination wheel assembly has been provided, having outstanding advantages.

It is the intention to cover changes and modifications not materially departing from the spirit and scope of the invention as indicated by the following claims.

What is claimed is:

1. In a harvester thresher, a thresher, a support hingedly connected thereto for folding from a normal transverse position to a longitudinal transport position alongside the thresher, a harvester on the support movable therewith, an arm on the free end of the support, said arm extending forwardly and outwardly when the support is in its normal transverse position, and a wheel pivotally connected to said arm by a pivot located within the wheel and forwardly of the turning axis of the wheel.

2. In a harvester thresher, a thresher, a support hingedly connected thereto for folding from a normal transverse position to a longitudinal transport position alongside the thresher, a harvester on the support movable therewith, an arm on the free end of the support, a wheel pivotally connected to said arm by a pivot located within the wheel, and means to releasably latch the wheel against castering.

3. In a harvester thresher, a thresher, a support hingedly connected thereto for folding from a normal transverse position to a longitudinal transport position alongside the thresher, a harvester on the support movable therewith, an arm on the free end of the support, a yoke pivotally connected to the arm, an axle pin carried by the yoke, a wheel journaled to the axle pin, the pivotal connection of the yoke to the arm being located within the wheel, and means to releasably latch the wheel against castering.

4. In a harvester thresher, a thresher, a support hingedly connected thereto for folding from a normal transverse position to a longitudinal transport position alongside the thresher, a harvester on the support movable therewith, an arm extended angularly from the free end of the support, and a wheel pivotally connected to said arm by a pivot located within the wheel, the turning axis of the wheel being coaxial with the axis of the support.

5. In a harvester thresher, a thresher, a support hingedly connected thereto for folding from a normal transverse position to a longitudinal transport position alongside the thresher, a harvester on the support movable therewith, an arm extended angularly from the free end of the support, a wheel pivotally connected to said arm by a pivot located within the wheel, the turning axis of the wheel being coaxial with the axis of the support, and means to releasably lock the wheel against castering movement about said pivot.

6. In a harvester thresher, a thresher, a support hingedly connected thereto for folding from a normal transverse position to a longitudinal transport position alongside the thresher, a harvester on the support movable therewith, an arm extended angularly from the free end of the support, a wheel pivotally connected to said arm by a pivot located within the wheel, the turning axis of the wheel being coaxial with the axis of the support, a normally forwardly, outwardly and horizontally extended arm carried by the free end of the support, a yoke member pivotally connected to the front end of the arm, said yoke member extending horizontally and normally rearwardly, said yoke provided with means for journaling a wheel, a wheel, and means to releasably latch the wheel against pivotal castering movement, said pivot located within the periphery of the wheel.

7. In a harvester thresher, a thresher, a support hingedly connected thereto for folding from a normal transverse position to a longitudinal transport position alongside the thresher, a harvester on the support movable therewith, an arm on the free end of the support, a wheel pivotally connected to said arm by a pivot located within the wheel, and means to releasably latch the wheel against castering, said wheel being provided with an offset hub and offset spokes to provide room for said pivot.

8. In a harvester thresher, a thresher, a support hingedly connected thereto for folding from a normal transverse position to a longitudinal transport position alongside the thresher, a harvester on the support movable therewith, a bracket secured to the free end of the support, said bracket provided with an angular outstanding arm, a yoke member pivoted to the arm and including a sleeve, an axle pin carrying a wheel journaled in said sleeve, the aforementioned pivot being located within the wheel, and a latch pin carried by the bracket adapted to be secured to said sleeve to releasably lock the wheel in place against castering.

9. In a harvester thresher, a thresher, a support hingedly connected thereto for folding from a normal transverse position to a longitudinal transport position alongside the thresher, a harvester on the support movable therewith, an arm extended angularly from the free end of the support, a wheel pivotally connected to said arm by a pivot located within the wheel, the turning axis of the wheel being coaxial with the axis of the support, an angularly forwardly and outwardly extending arm, a yoke member pivoted to the front end of the arm and normally extending rearwardly, said yoke member including a sleeve, an axle pin carrying a wheel journaled in said sleeve, the aforementioned pivot being located within the wheel, and a latch carried by the bracket adapted to be secured to the sleeve to releasably lock the wheel in place against castering.

10. A harvester thresher having a harvester support foldable horizontally from a transverse to a longitudinal position, a wheel carrying the outer end of said support, said wheel having a pivotal connection to enable it to caster, said pivotal connection being located in spaced relation to its turning axis but within its periphery, and means releasably to latch the wheel against castering.

ALBERT B. WELTY.